(12) United States Patent  (10) Patent No.: US 7,545,397 B2
O'Dea et al.  (45) Date of Patent: Jun. 9, 2009

(54) ENHANCING CONTRAST

(75) Inventors: Stephen R. O'Dea, Wilmington, MA (US); Michael O'Connell, Northborough, MA (US); William Berardi, Grafton, MA (US)

(73) Assignee: Bose Corporation, Framingham, MA (US)

( * ) Notice: Subject to any disclaimer, the term of this patent is extended or adjusted under 35 U.S.C. 154(b) by 733 days.

(21) Appl. No.: 10/972,595

(22) Filed: Oct. 25, 2004

(65) Prior Publication Data

US 2006/0088275 A1  Apr. 27, 2006

(51) Int. Cl.
G09G 3/02 (2006.01)
(52) U.S. Cl. .................. 345/694; 345/77; 345/204; 345/207; 345/690; 345/692
(58) Field of Classification Search ......... 345/690–697, 345/48, 51, 77, 204, 207
See application file for complete search history.

(56) References Cited

U.S. PATENT DOCUMENTS

| | | | |
|---|---|---|---|
| 4,451,849 A | | 5/1984 | Fuhrer |
| 4,667,304 A | * | 5/1987 | Hier et al. .................. 708/819 |
| 4,720,745 A | | 1/1988 | DeForest et al. |
| 4,908,876 A | | 3/1990 | DeForest et al. |
| 5,059,957 A | * | 10/1991 | Todoriki et al. ................ 345/7 |
| 5,670,985 A | | 9/1997 | Cappels et al. |
| 5,786,803 A | | 7/1998 | Hernandez et al. |
| 6,411,306 B1 | * | 6/2002 | Miller et al. ................ 345/690 |
| 6,460,999 B1 | | 10/2002 | Suzuki |
| 6,597,410 B1 | | 7/2003 | Doany et al. |
| 6,634,757 B2 | | 10/2003 | Asakawa |
| 6,762,741 B2 | * | 7/2004 | Weindorf .................... 345/102 |
| 6,824,281 B2 | * | 11/2004 | Schofield et al. ............ 359/876 |
| 7,314,283 B2 | * | 1/2008 | Tsukada ..................... 353/121 |
| 2003/0058252 A1 | * | 3/2003 | Matsuda et al. ............. 345/589 |
| 2003/0147468 A1 | * | 8/2003 | Matsumura et al. ..... 375/240.16 |
| 2003/0202772 A1 | | 10/2003 | Dow et al. |
| 2004/0135799 A1 | * | 7/2004 | Shiomi et al. ............... 345/690 |
| 2004/0207613 A1 | | 10/2004 | Morisawa |
| 2005/0093795 A1 | * | 5/2005 | Lin et al. ...................... 345/88 |
| 2006/0238551 A1 | * | 10/2006 | Dalal ......................... 345/690 |

FOREIGN PATENT DOCUMENTS

| | | |
|---|---|---|
| CN | 1410872 | 4/2003 |
| EP | 1 363 462 | 11/2003 |
| JP | 06012022 | 1/1994 |
| WO | WO 94/18790 | 8/1994 |
| WO | WO 02/47395 | 6/2002 |

OTHER PUBLICATIONS

Office Action in Chinese Application No. 200510113877.2, dated May 9, 2008.
Notice of Allowance and Minutes of the Oral Proceedings in corresponding EPO Application No. 05109283.1, dated Jul. 7, 2008.
Office Action dated Dec. 26, 2008 in corresponding Chinese Application no. 200510113877.2.

* cited by examiner

*Primary Examiner*—Bipin Shalwala
*Assistant Examiner*—Vince E Kovalick
(74) *Attorney, Agent, or Firm*—Fish & Richardson P.C.

(57) ABSTRACT

Video processing for enhancing contrast includes detecting the ambient light levels on a display, performing local contrast enhancement processing to emphasize the luminance component based on the detected ambient light levels to provide a processed video signal, and presenting the processed video signal on the display.

28 Claims, 12 Drawing Sheets

ENHANCING CONTRAST

This invention relates to video signal processing, and more particularly to video signal processing to enhance contrast.

BACKGROUND OF THE INVENTION

For background reference is made to U.S. Pat. Nos. 6,634,757, 6,597,410, 6,460,999, 4,908,876, 4,720,745, 4,667,304.

SUMMARY OF THE INVENTION

According to the invention process a video signal for a display including detecting ambient light levels, performing local contrast enhancement processing on the video signal based on the detected ambient light levels to provide a processed video signal and presenting the processed video signal to the display. The local contrast enhancement may be performed on a luminous component of the video signal. The luminous component may be associated with object shapes and textures. The local contrast enhancement may be on a pixel-by-pixel basis or a spatial filter that may be a two-dimensional spatial filter that varies based on detected ambient light levels. The local contrast enhancement may include all-pass filtering and low-pass filtering the video signal and subtracting the low-pass filtered component from the all-pass filtered component to obtain high frequency components. The local contrast enhancement processing may include determining an enhancement processor for each pixel depending on the detected ambient light levels. The local contrast enhancement may be characterized by a static gain and/or a dynamic gain. The local contrast enhancement may be adjusted dependent on the comparison of pixel image brightness to the detected ambient light levels. The static gain may increase when the image brightness in the pixel is less than the detected ambient light level and decrease when the image brightness in the pixel is greater that the detected ambient light level. Adjusting of the enhancement processing may be controlled by an enhancement control variable that has a functional representation with values increasing when the image brightness in the pixel is less than the detected ambient light level and decreasing when the image brightness in the pixel is greater than the detected ambient light level. The local contrast enhancement processing maybe preceded and followed by two luminous adjustment processes dependent on comparison of pixel image brightness and the detected ambient light level, may be substantially complementary and may be controlled in accordance with an input-output luminous mapping table dependent on the detected ambient light level that may include a set of mapping curves generated by a functional representation that may be a gamma function.

The display device may be a screen for presenting images, and the invention may include measuring the light intensity in one or more areas surrounding the screen, and estimating the ambient light level falling on the screen based on the measured surrounding light intensity and on a relationship between the measured surrounding light intensities and the ambient light level by comparing the measured surrounding light intensities in the one or more areas with that on the screen. The surrounding light intensities may be measured when the display device is off. The light intensity on the screen may be monitored, and the ambient light intensity separated from the monitored light intensity by distinguishing ambient light from the light generated by the display device that may employ an optical method for determining the polarizing angle of light generated by the display device and separating the ambient light intensity by sensing light orthogonally or flaggingly polarized to the polarizing angle and/or may employ a spectral filtering method determining colors of the display device and separating the ambient light intensity by blocking the display device colors from the monitored light intensity. Time intervals when some portion of the screen is black may be identified, and ambient light intensity measured in that portion. The video signal may be monitored to identify the time intervals when the video signal consists of a blanking signal. The screen may be driven using image patterns representing available luminance intensity range of the displayed device, detecting ambient light levels and mapping the luminance intensity level within the range to the detected ambient light level.

A video processing system having a display and video signal may include a device for detecting the ambient light levels on the display and providing a detected ambient light level signal, a processor responsive to the detected ambient light level signal for processing the video signal, performing pixel-by-pixel contrast enhancement processing on the video signal based on the detected ambient light levels to provide a processed video signal, and a display device having an active screen area for presenting the processed video signal on the display. The device for detecting the ambient light levels may be a camera for imaging at least one of the active screen area and the surrounding areas of the display device, or one or more light sensors located near the active screen area of the display device. The processing may further include processing with a 2-D high-pass filter and/or an all-pass filter and a 2-D low-pass filter that may be responsive to the detected ambient light signal. The processor may further include a comparator for comparing the video signal pixel brightness to the detected ambient light levels and providing a pixel-based contrast enhancement processing signal based on the comparison.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
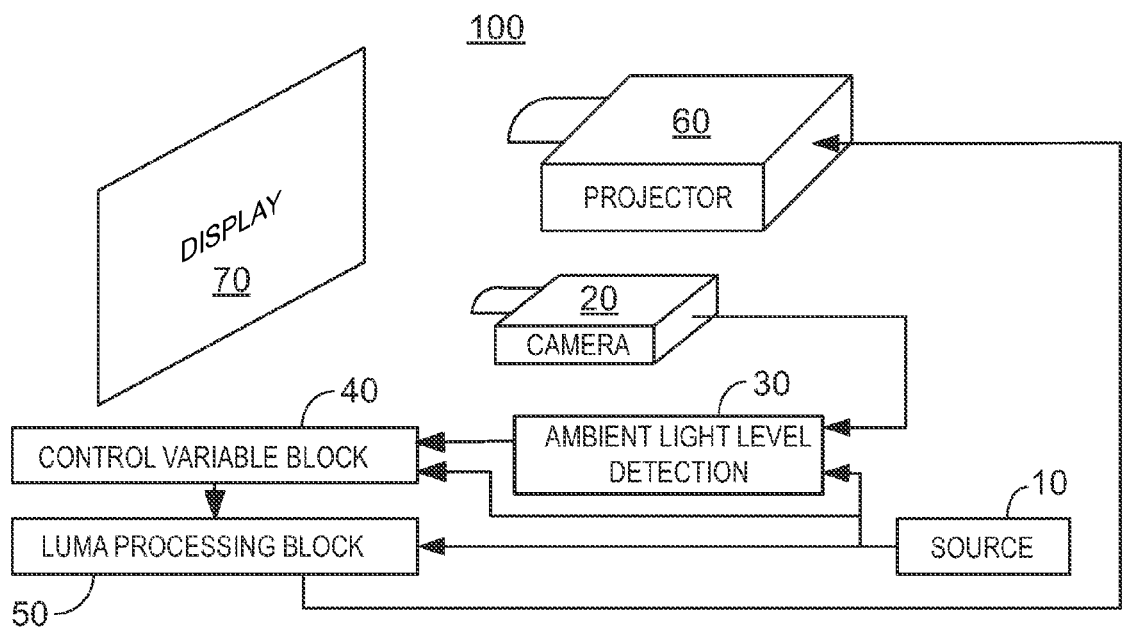
FIG. 1 shows the functional block diagram of an embodiment, in accordance with the present invention.

FIG. 1 shows the functional block diagram 100 of an embodiment in accordance with the present invention. To detect the video display screen luminance due to ambient light, a detection device, such as a camera 20 images the display screen 70 and/or areas surrounding the screen, such as the screen mask. The display screen luminance due to ambient light is then estimated in an ambient light level detection block 30 using the signal from the detection device along with the video signal from video source 10. The estimated ambient light level signal in block 30 can be utilized to determine one or more ambient light level-dependent control variables in block 40, which controls the luma processing in block 50. The function and determination of control variables are described in more detail below. The video signal from source 10 can be represented using the color video component format; namely, one channel of luma information Y, and two channels of color difference information Cb and Cr. The luma processing block 50 then provides contrast enhancement processing on luminance components associated with object shapes and textures extracted from the video signal. The approach is to emphasize the components of the image luminance which leads to the perception of shapes and textures.

Visual psychophysics are "tuned" to detect edges, which are defined by differences of image luminance (e.g, boundaries of the gray scale bars). The luminance component associated with object shapes and textures can be enhanced from the video image luma signal by applying a spatial high-pass filter to each frame of a video sequence. There are numerous methods known to accomplish spatial high-pass filtering, any of which may be used here. One alternative embodiment generates a high-pass filter function using low-pass and all pass filters. The spatial high-pass filter is implemented by subtracting the output of a low-pass filter from the output of an all-pass filter. The high-pass filtering can be performed in either one or preferably two dimensions: horizontal and vertical. The contrast enhancement processed signal is projected by projector 60 and presented on the display screen 70. The luma processing in block 50 is typically accomplished pixel-by-pixel.

The display screen luminance due to ambient light can be detected via a variety of arrangements. Two of such arrangements will be described below for illustration purposes: 1) a camera imaging the active area and/or surrounding areas of the screen, which is especially suitable for front projection systems and 2) one or more light sensors located near the active screen area, which is especially suitable for direct view or rear view projection systems.

Figure 2A:
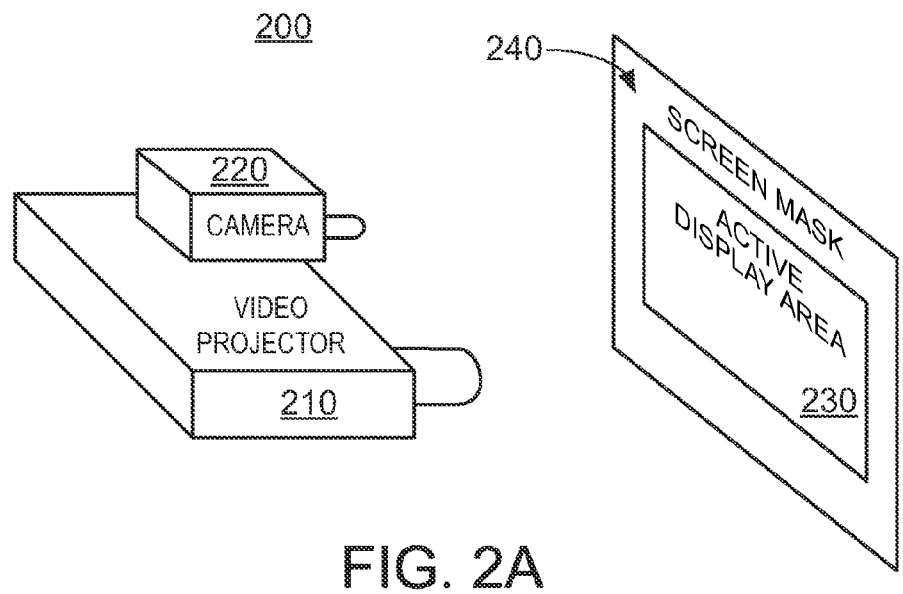
FIG. 2(a) is an arrangement for ambient light detection using camera imaging.

FIG. 2(a) is an arrangement 200 for ambient light estimation using a detection device, such as an imaging camera. A camera 220 is co-located with video projector 210. The ambient light level could be sensed by imaging areas of the active screen area 230, and/or areas outside of the active screen area, such as the screen mask 240. This arrangement is especially practical for a front projection system.

Figure 2B:
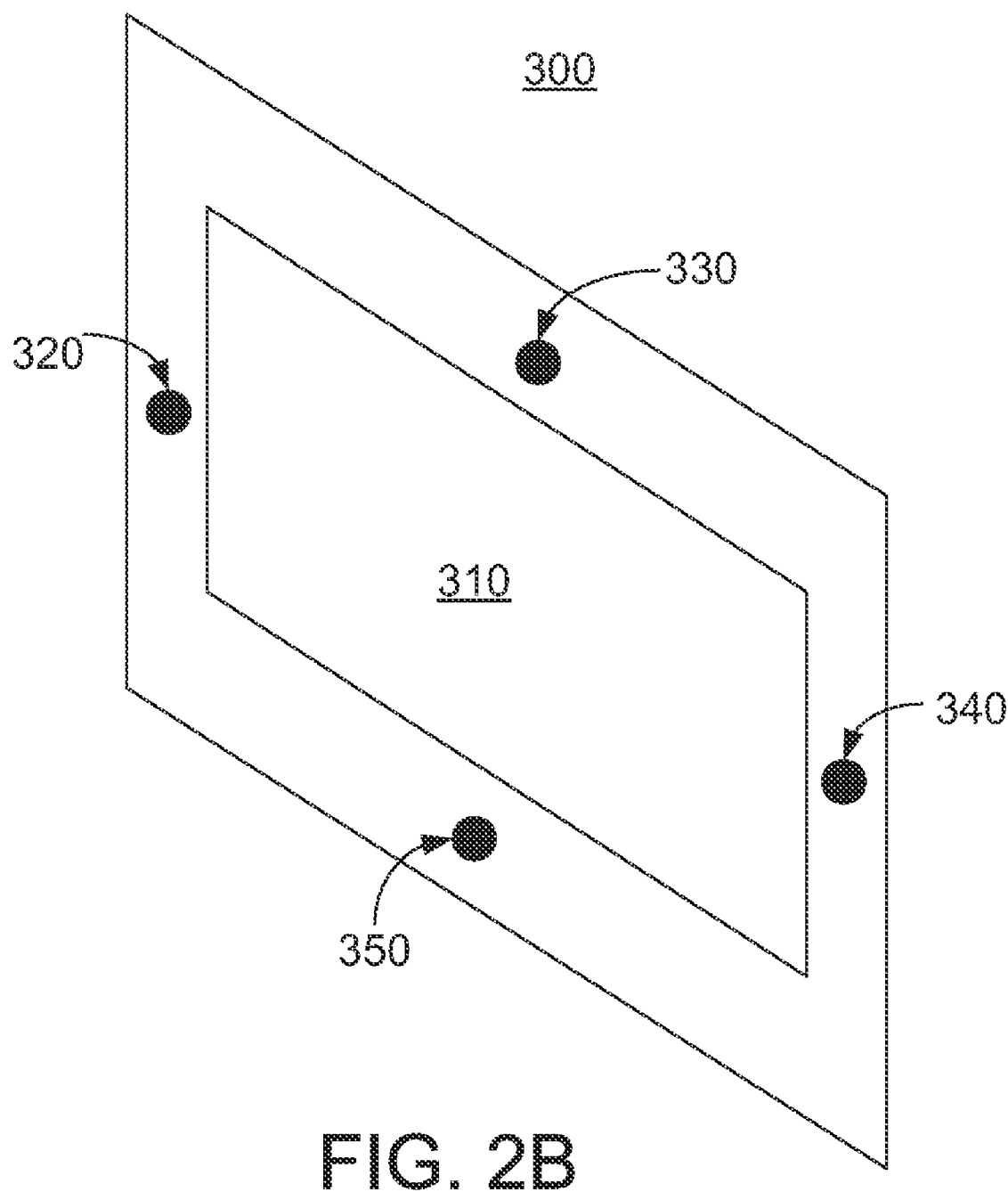
FIG. 2(b) is another arrangement for ambient light detection using light sensor(s)

FIG. 2(b) is another arrangement 300 for ambient light estimation using light sensor(s). One or more light sensors 320, 330, 340 and 350 are mounted in areas, such as the screen mask, in local proximity to and surrounding the active screen area 310. Although this arrangement is especially suitable for direct or rear view projection system, it can also be used for front projection systems with the sensors preferably shielded from any direct light from the projector, or limiting detection to occur only during video blanking intervals.

Direct active screen area monitoring of the ambient light (e.g, FIG. 2(a)) typically embodies a sensing system able to distinguish ambient light energy in the active screen area from the desired light energy radiated (or re-radiated or generated) by the display screen. This can be accomplished using 1) optical separation of these two light sources; alternatively, 2) the projected image could be monitored, video processing can determine if the complete image or part of the image is "black" and measure those portions of the screen that correspond to black portions of the image to estimate the ambient light. The second approach is compatible with any type of display.

Figure 3A:
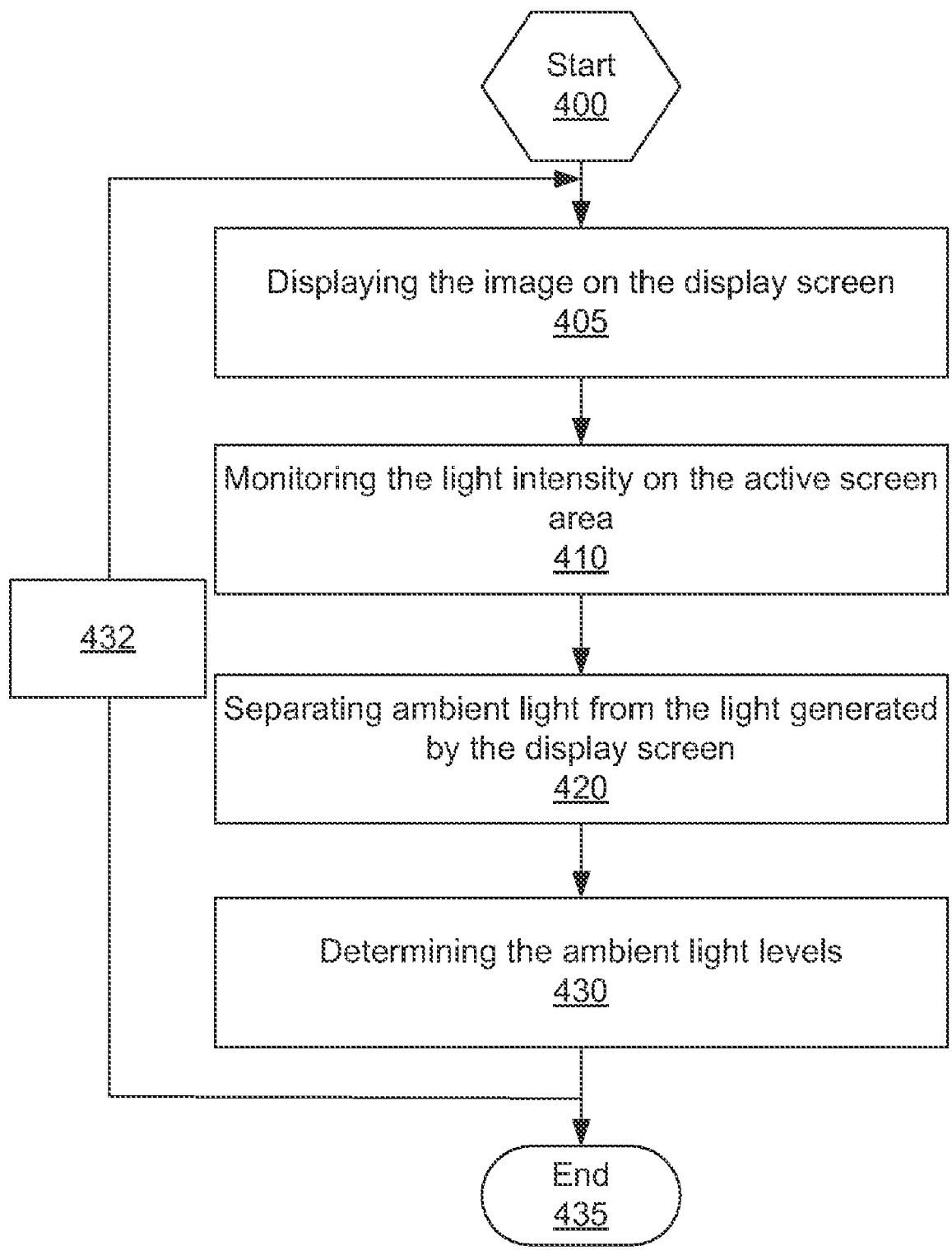
FIG. 3(a) is a procedure of active screen area monitoring of the ambient light.

The procedure for active screen area monitoring of the ambient light by separating ambient light from desired light radiated (or re-radiated or generated) by the display device, is illustrated in FIG. 3 (a). This approach involves projecting the image on the display screen 405; monitoring the light intensity on the active display screen area 410 with a camera or sensor; and separating the ambient light from the monitored light by distinguishing ambient light from the light generated by the display screen 420. The separation can be done employing a number of different methods. One optical method determines the polarizing angle of desired light radiated (or re-radiated or generated) by the display screen and separates the ambient light from the desired light by sensing light orthogonally polarized to the polarizing angle of the desired light. Another method employs spectral filtering along with a priori knowledge of the spectral content of the desired light. Spectral filtering is used to monitor light from the display screen in frequency regions other than those regions where desired light is present. Display devices typically use three or more colored light sources to reproduce a full range of colors (CRT and LCD systems use red, green and blue primaries). Assuming the ambient light is broadband, an ambient light sensing device, such as a camera, may be fitted with a filter that blocks the display system drive colors. The ambient light levels will be determined in block 430. The ambient light level can be continuously monitored 432. It should be noted that some steps can occur simultaneously although FIG. 3(a) shows a sequential flow.

Figure 3B:
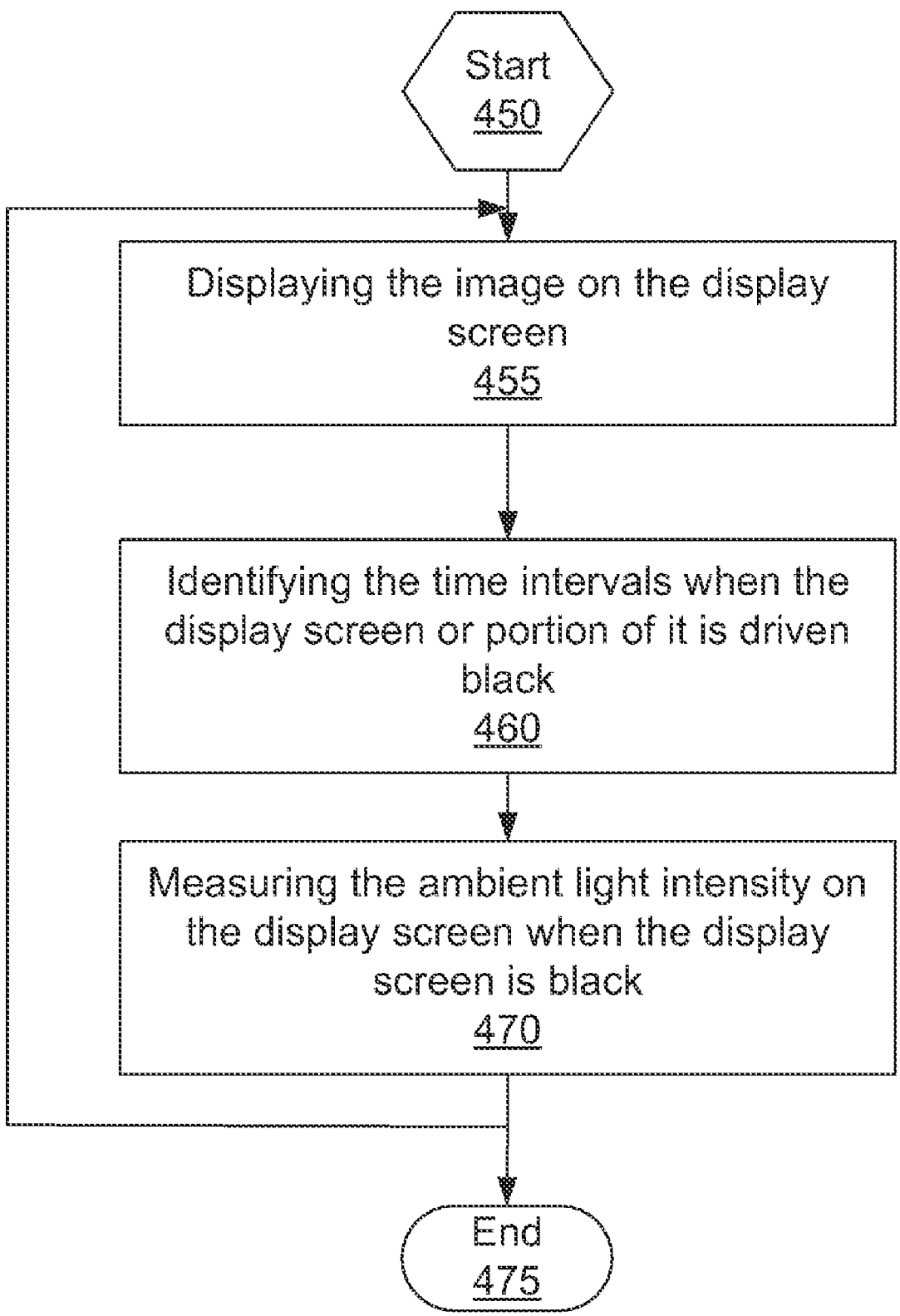
FIG. 3(b) is another procedure of active screen area monitoring of the ambient light.

An alternative procedure for direct active screen area monitoring of ambient light, which does not separate ambient light from light generated by the display device, is illustrated in FIG. 3(b). A projector projects the image on the display screen 455. The time intervals when the complete display screen or a portion thereof is driven black are then determined 460. Alternatively the available blanking signal in the video signal can be utilized when the display screen is blank (or black). The ambient light intensity is then determined by measuring during the appropriate time (i.e. when the measured portions of the screen are black) those portions of the screen that correspond to black portions of the image 470. This approach may be suitable for color-sequential display systems such as micro-mirror (DLP) displays that include "white" light illumination as part of the color sequence.

Figure 3C:
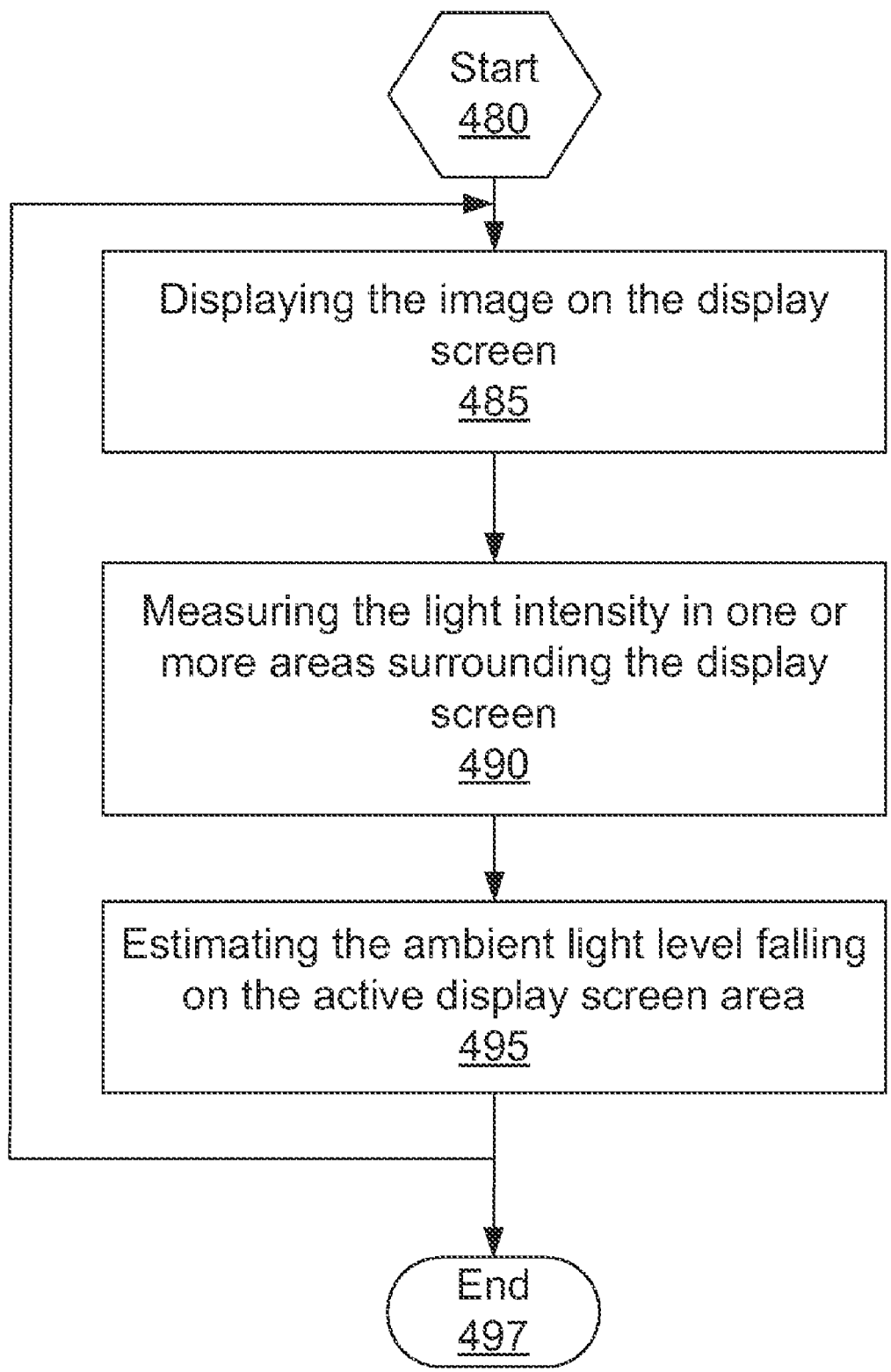
FIG. 3(c) is a procedure of off-screen inferred monitoring of ambient light.

For off-screen monitoring (e.g, FIG. 2(b)), a relationship between the ambient light levels falling on the active display screen and measured light levels falling on inactive areas near the active areas of the screen can be established and stored in a look-up table. The levels of the ambient light falling on the active screen area are then estimated by measuring the light intensity in one or more areas near the display screen. The off-screen levels are referenced against the look-up table to estimate the ambient light level falling on the screen. FIG. 3(c) shows a procedure for off-screen monitoring of ambient light. A projector projects the image on the display screen 485; the light intensity in one or more areas surrounding the display screen is measured 490; the ambient light level falling on the active display screen is estimated 495 based on the relationship between the ambient light levels on the active display screen and the measured light levels. The relationship between the ambient light levels on the active display screen and the measured light levels, represented by a look-up curve, may be determined with a "turn-on" calibration procedure by comparing the active screen area light level to the chosen ambient light detection area, before the projection system begins to project any light on the active screen area. This comparison may be done during turn-on or turn-off sequences, or any time the displayed image is a uniform black field. Performing the comparison during times when the displayed image is a uniform dark field allows the system to adapt to changes in conditions over time while the system is in use.

As will be described in more detail below, the contrast enhancement processing is based on relative intensity comparison between ambient light and video luma signals being displayed. To facilitate using the detected ambient light level signals to adjust the contrast enhancement processing, the ambient light signal levels in the active screen areas are mapped into equivalent video input drive levels (numeric video luma signals being displayed). For example, an ambient light level might be equivalent to a numeric luma drive level of 100, so significant processing would be applied to portions of the image with luma levels below 100, and less to areas with levels above 100. The calibration mapping described below will provide a relationship of how display screen luminance levels relate to video input drive levels for the display device in use. According to one mapping, with the available luminance levels of a display device generated from a range of 8-bit numbers from 0 to 255, the detected ambient light levels (represented as display screen luminance levels) as described above, either from direct active screen monitoring or from off-screen monitoring, can be mapped to the equivalent video input drive level.

Figure 4A:
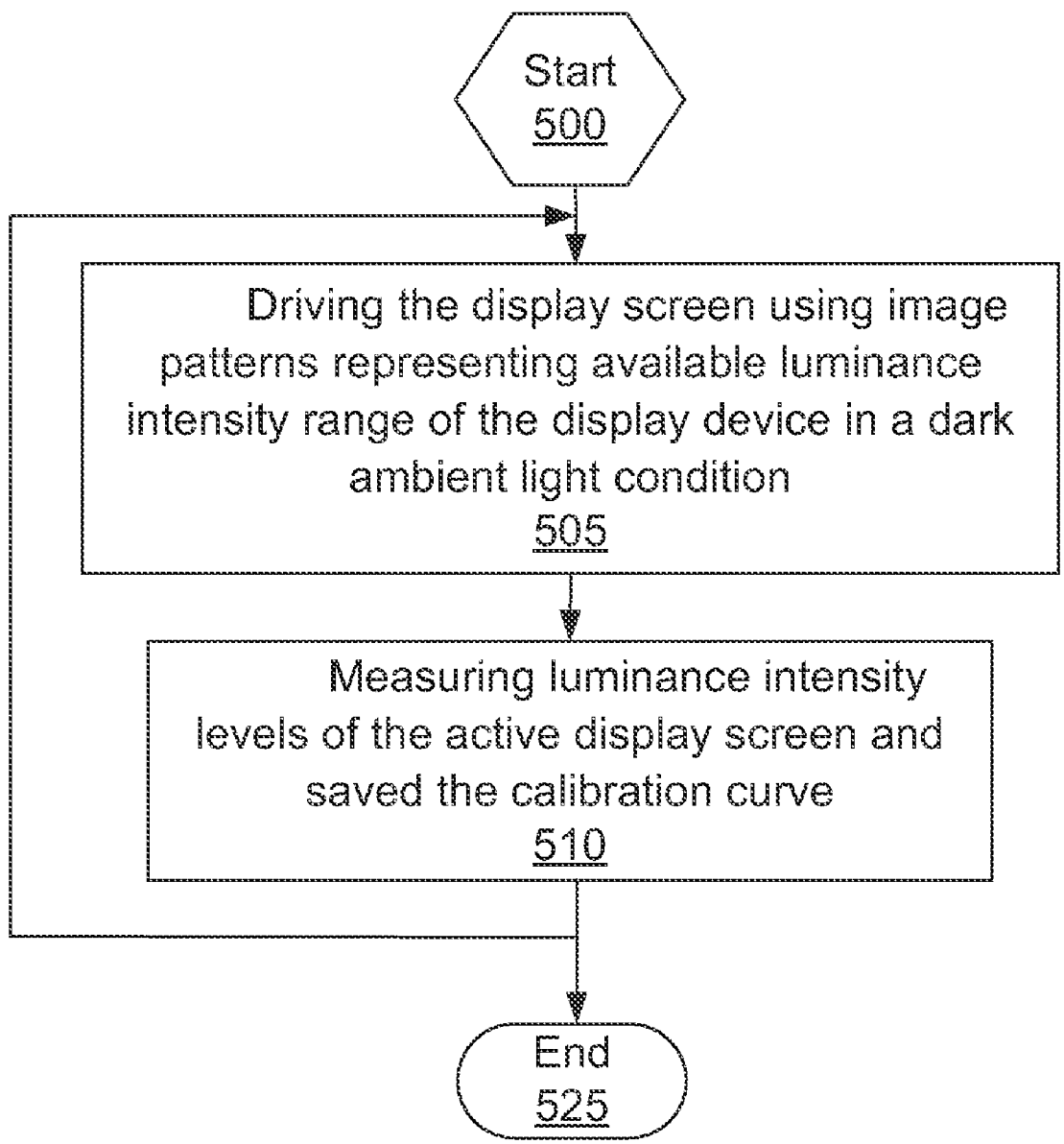
FIG. 4(a) is a calibration procedure.
Figure 4B:
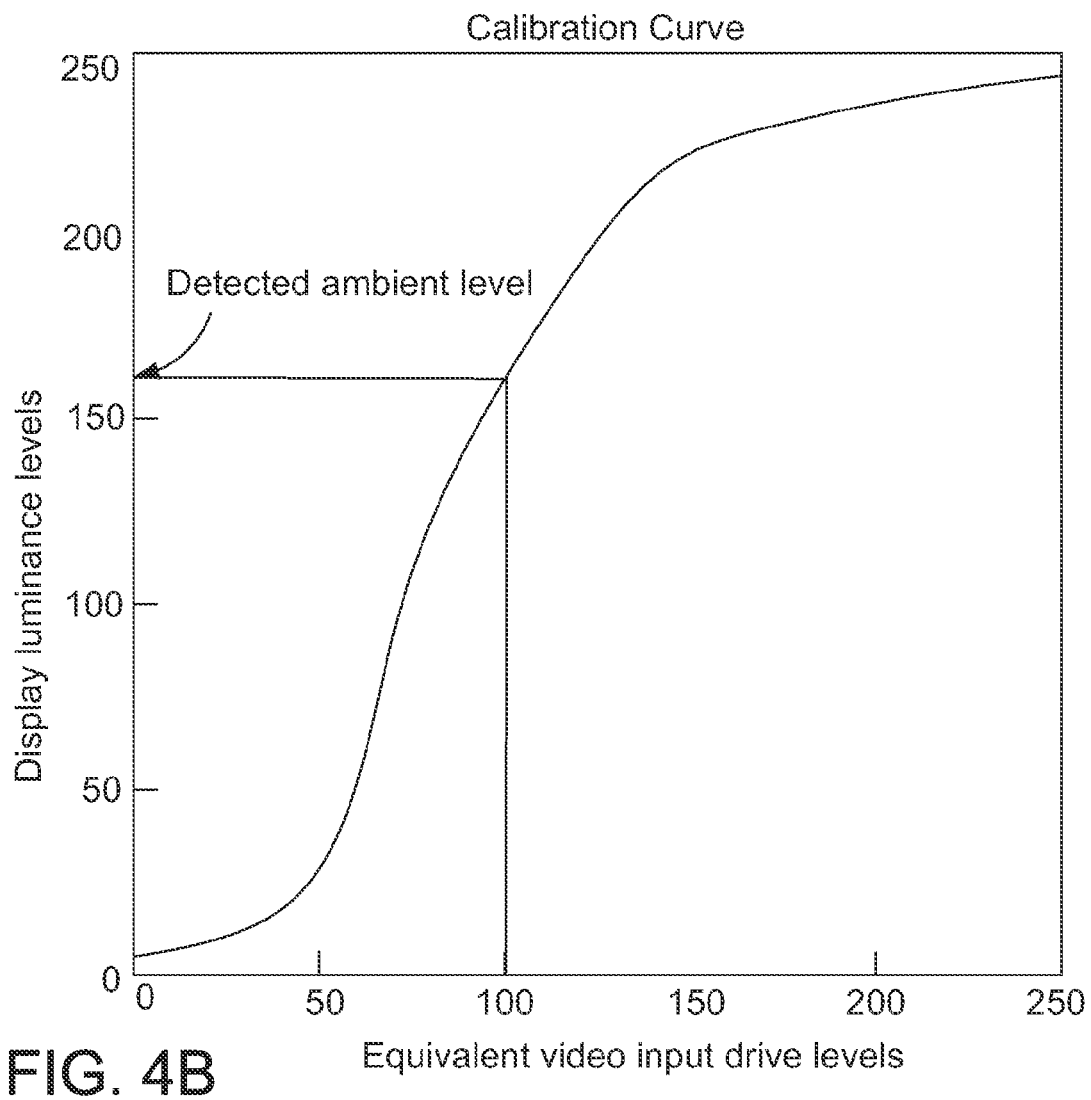
FIG. 4(b) is an exemplary calibration curve.

Referring to FIG. 4(a), the display screen is driven using video image patterns representing the available luminance intensity range of the display device in a dark ambient light condition 505. Typically, the projection system is driven with stepped drive levels, i.e. full screens of gray at levels of 0, 32, 64, ... 255, where the video drive levels are represented with 8 bit levels. The luminance intensity levels of the active display screen then are measured and the calibration curve is then obtained and saved 510. The resulting video input drive levels vs. display luminance levels relationship can then be used to obtain video input drive equivalent ambient light levels. FIG. 4(b) is an exemplary calibration curve showing how the detected ambient light levels are mapped into equivalent video input drive levels. The detected ambient light levels are normalized here to an eight-bit scale. As shown, a detected ambient light level 162.5 is equivalent to a video input drive level 100. There are many different ways of representing the calibration relationship besides the disclosed calibration curve, such as an array, a table, or other approaches known to those skilled in the art.

Figure 5:
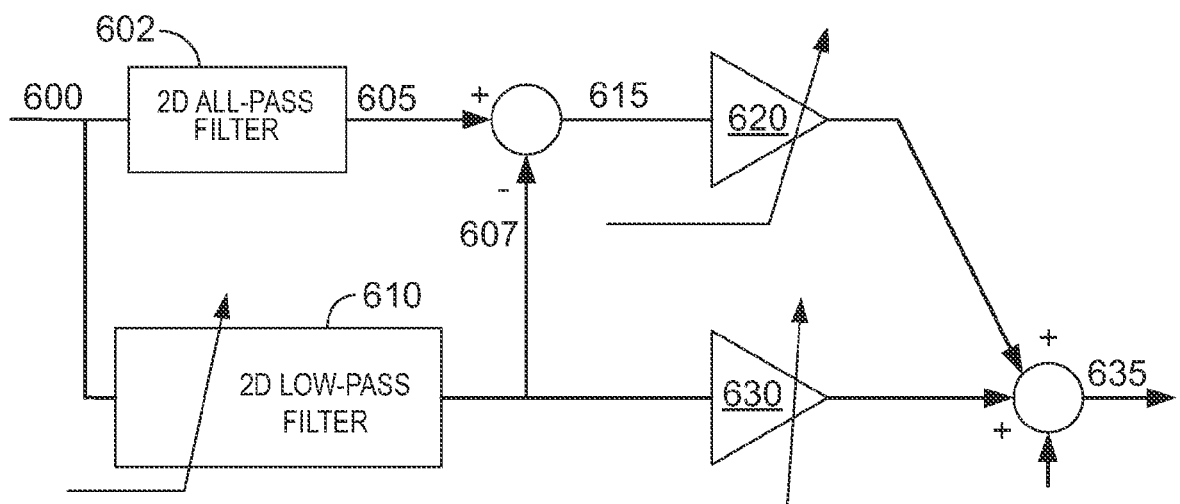
FIG. 5 shows one embodiment of luminance processing including high-pass filtering.

Referring again to FIG. 1, in luma processing block 50, the video luma signal from video source 10 is first extracted to obtain the luminance information. FIG. 5 shows one embodiment of local contrast enhancement processing including high-pass filtering. The thick lines represent 2D video image related signal flows, and the thin lines are scalar quantities. The bent arrows drawn through the triangles and rectangles represent variable inputs. The luma component 600 of the video signal is divided into two paths: one is fed into a 2-dimentional low-pass filter 610 to obtain signal component 607, another one passes through a 2D all-pass filter 602 to obtain signal component 605. The signal component 607 is subtracted fromb 605 to obtain the equivalent high-pass filtered information 615. The information 615 may also be alternatively determined with a high-pass filter alone without using the combination of all-pass filtering and low-pass filtering as described above.

The signal component 615 is then processed to perform local contrast enhancement with variable high-pass processor 620. The low-pass signal component may also be processed with variable low-pass processor 630. The processors 620 and 630 can be in the form of static simple gains or can be in the form of adaptive dynamic systems such as filters that include temporal smoothing or hysteresis. The two processed signals are then combined to obtain the luma processed signal 635, which is representative of the luminance projected on the display screen 60. The high-pass processor 620 and low-pass processor 630 can be controlled as a function of ambient light (and possibly other variables also). The low-pass filter 610 can also be dependent on ambient light or other variables. The overall brightness of the processed signal can be further adjusted via a background offset signal 640 (which can also be ambient light and pixel dependent, or dependent on other variables), explained in detail below. FIG. 5 shows the implementation with ambient light dependent varibale gains 620 and 630 following the 2-D filter processing 602 and/or 610. It should be noted that the ambient light dependent characteristic can be impelmented in the filters 602 and/or 610 while leaving gains 620 and/or 630 not dependent on ambient light.

In one embodiment, the local contrast enhancement processing is controlled by a variety of ambient light level dependent control variables, depending on the implementations of the luminance processing block 50. For example, a commercially available HT70e luminance processor from Digivision, San Diego, Calif. may be used to accomplish one form of contrast enhancement processing of block 50. In the Digivision HT70e based system, two control variables, contrast control variable "c" and background control variable "b", control the luminance processing. Specifically, the high-pass processor 620 and low-pass processor 630 are implemented as ambient light dependent static gains, such that the HP processor 620 uses c, and the LP processor 630 uses 1−b. The background offset signal 640 which adjusts overall brightness of the processed signal has a floor value: FV 640=b*M. Here, M is a matrix of ones with size equal to the video frame size representing the uniform desired mean brightness. The offset signal is used to shift low intensity portions of the image up towards or above the ambient light level.

The luminance processed signal Y (635 in FIG. 5) may be determined from the luma input signal X (600 in FIG. 5) using the following relationship:

$$Y = c(X_{ap} - X_{bar}) + (1-b)X_{bar} + bM$$

where $X_{ap}$ 605 is the all passed version of input 600, $X_{bar}$ is the low-passed image luma (607 in FIG. 5), formed by passing input 600 through variable low-pass filter 610, $X_{ap} - X_{bar}$ is the equivalent high-passed image luma (615 in FIG. 5). The corner frequency of low-pass filter 610 can be varied to accommodate variation in ambient light level or input signal characteristics.

The ambient light dependent luma processing typically comprises a number of steps: dynamically monitoring and detecting the ambient light on the display screen 70; performing local contrast enhancement processing; and projecting processed signal on the display screen 70 with projector 60. The local contrast enhancement is implemented on a pixel-by-pixel basis.

Figure 6:
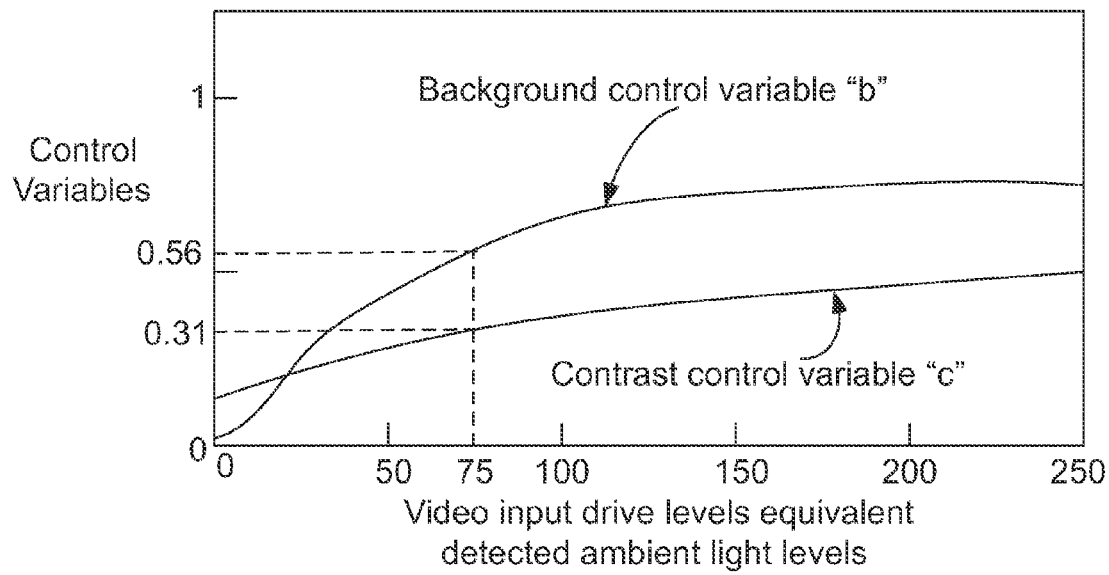
FIG. 6 is an ambient light compensation control variable look-up curve.

The control variables, such as the contrast control variable "c" and background control variable "b", for the illustrated Digivision HT70e based implementation, can be determined from a look up curve as shown in FIG. 6. The curves in FIG. 6 can be experimentally obtained by determining the settings that give the best psycho-visual effect on contrast. In FIG. 6, the vertical axis represents the control variable values, and the horizontal axis represents the video input drive levels equivalent to the detected ambient light levels (determined from FIG. 4(*b*)). The variable values shown for use with the Digivision HT70e are further normalized to have values between 0 and 1 for the b and c variables. The equivalent video input drive levels of the detected ambient light function as an index to look up the corresponding control variable values: contrast control variable "c" and background control variable "b". As shown, for detected ambient light level 75, normalized "c" variable is 0.31 and "b" variable is 0.56.

The contrast enhancement processing described so far applies uniform processing throughout a video frame based on the overall detected ambient light level. Additional benefit may be derived by adaptively adjusting contrast enhancement processing such as the high-pass and/or low-pass processors by incorporating local brightness information in each pixel so that the amount of the localized image contrast enhancement is scaled based on the relative intensity level of ambient light and displayed image brightness of the pixel. The pixel image brightness is determined by the incoming video signal. This approach avoids applying the same amount of enhancement equally to both bright image areas and dark image areas, which may cause bright areas of the image to have excessive contrast when dark areas of the image may be enhanced. This approach can be accomplished with numerous techniques, such as complex dynamic real-time adaptive schemes or a gain control variable used to adjust the processors which will be described below.

Figure 7:
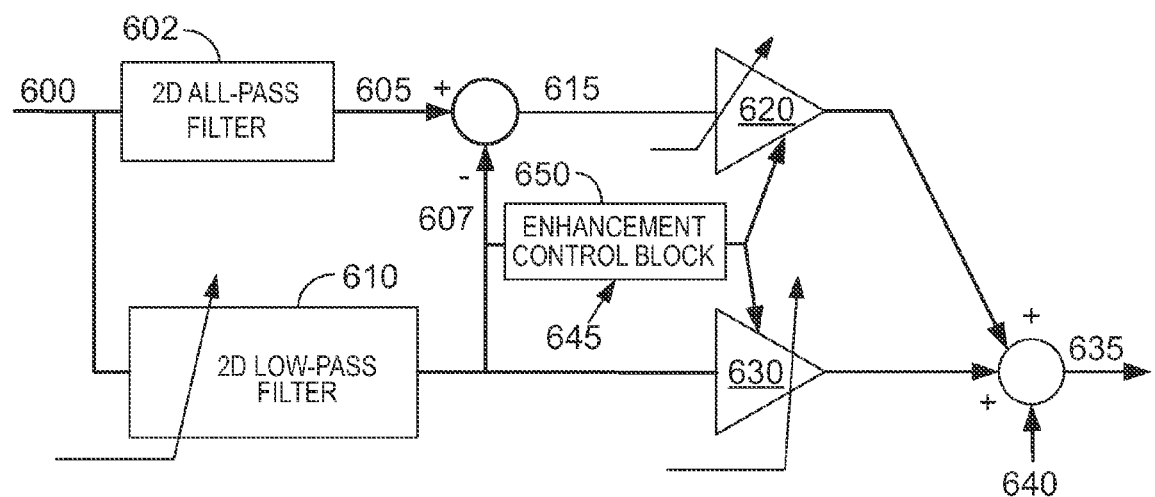
FIG. 7 shows another embodiment of high-pass filtering.

FIG. 7 shows an embodiment having adaptive enhancement control variable 650. The enhancement control block 650 can be a variable with value between 0 and 1 derived from comparison of the local image low-pass luma 607, representing the pixel image brightness, to the detected ambient light level 645. The enhancement control variable increases when the image brightness (represented via the low-passed luma, 607 in FIG. 5) in the pixel is less than the detected ambient light, and decreases when the image brightness in the pixel is greater than the detected ambient light. The enhancement control variable can be used to adjust the high-pass 620 and/or low-pass 630 processor.

There are numerous possible functional representations for determining the enhancement control variable, which has the characteristic of having a value of 1 when the ambient light level is higher than the local low-passed image luminance, decreasing with increasing image level near or above the ambient light level, and approaching 0 when the ambient light level is lower than the local low-passed image luminance. For illustration purposes, one functional representation can be:

$$E_g = \begin{cases} 1, \frac{A_L}{I_L} \geq 1 \\ \frac{A_L}{I_L}, 1 > \frac{A_L}{I_L} \end{cases}$$

where $E_g$ is the enhancement control variable, $A_L$ is the ambient light level 645, $I_L$ is the low-passed local image luminance 607. $E_g$, $I_L$ and $A_L$ are all matrices having the size of an image frame. The division operation is done on a pixel-by-pixel basis. The relationship between Y and Eg is:

$$Y(m,n) = X(m,n) + G_{hp}E_g(m,n)[X(m,n) - X_{bar}(m,n)] + G_{lp}E_g(m,n)X(m,n) + K$$

where $Y(m,n)$ is the luminance processed signal, $G_{hp}$ is the gain of the high-pass filter, $E_g(m,n)$ is the enhancement control variable, $X(m,n)$ is the luma input signal, $X_{bar}(m,n)$ is the low-passed image luma, $G_{lp}$ is the gain of the low-pass filter, and K is an additive constant. The subscripts m and n indicate the pixel position in the image. Among many possible ways of implementing the concept, in this implementation, the enhancement functions as an adjustment perturbation to the main signal flow $X(m,n)$ (from 605 to 635). So when the adjustment is not necessary (the enhancement goes to zero), the picture will not go to black.

Figure 8A:
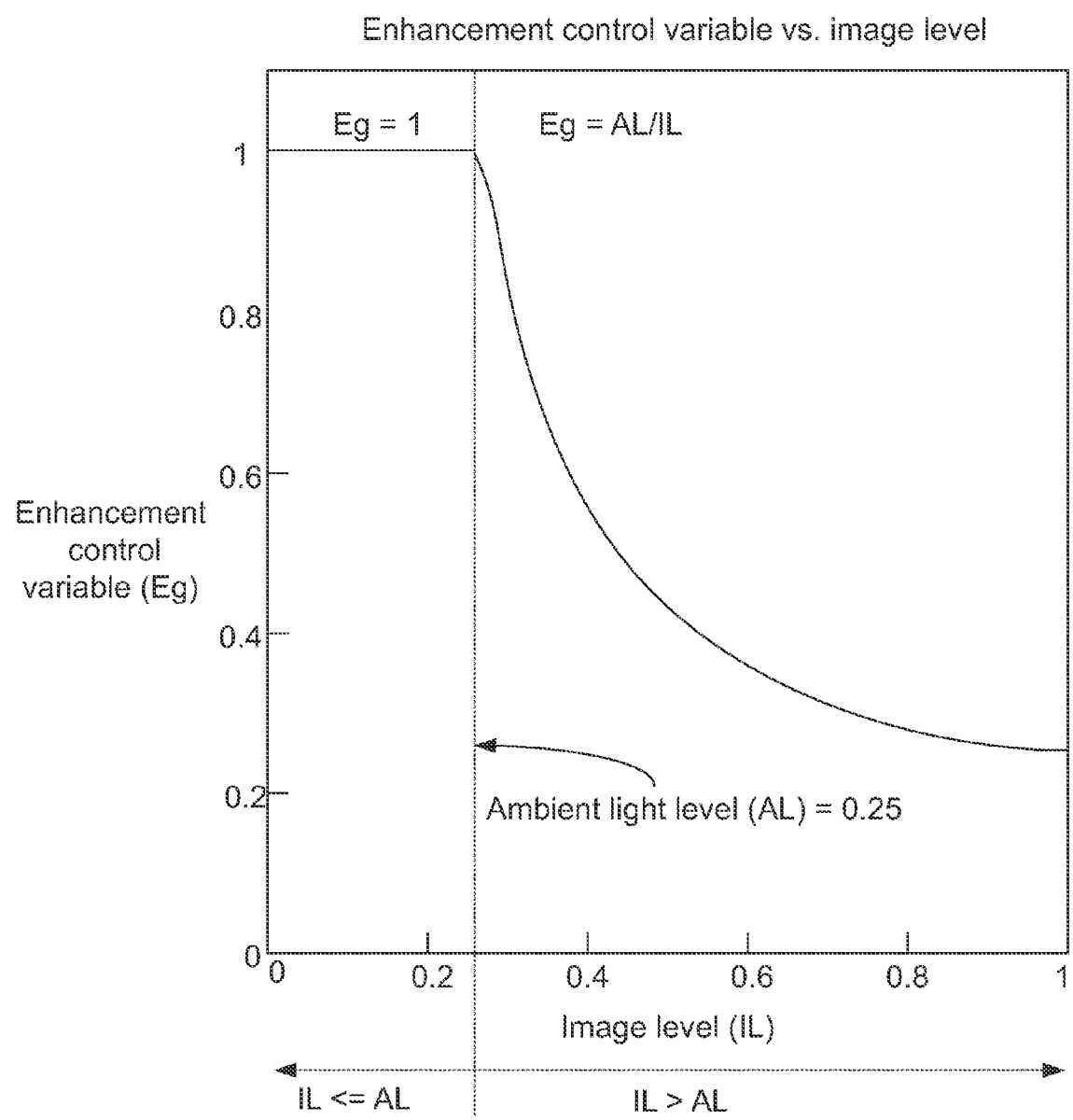
FIGS. 8(a) and 8(b) are graphical representations of enhancement control variable as a function of image level.
Figure 8B:
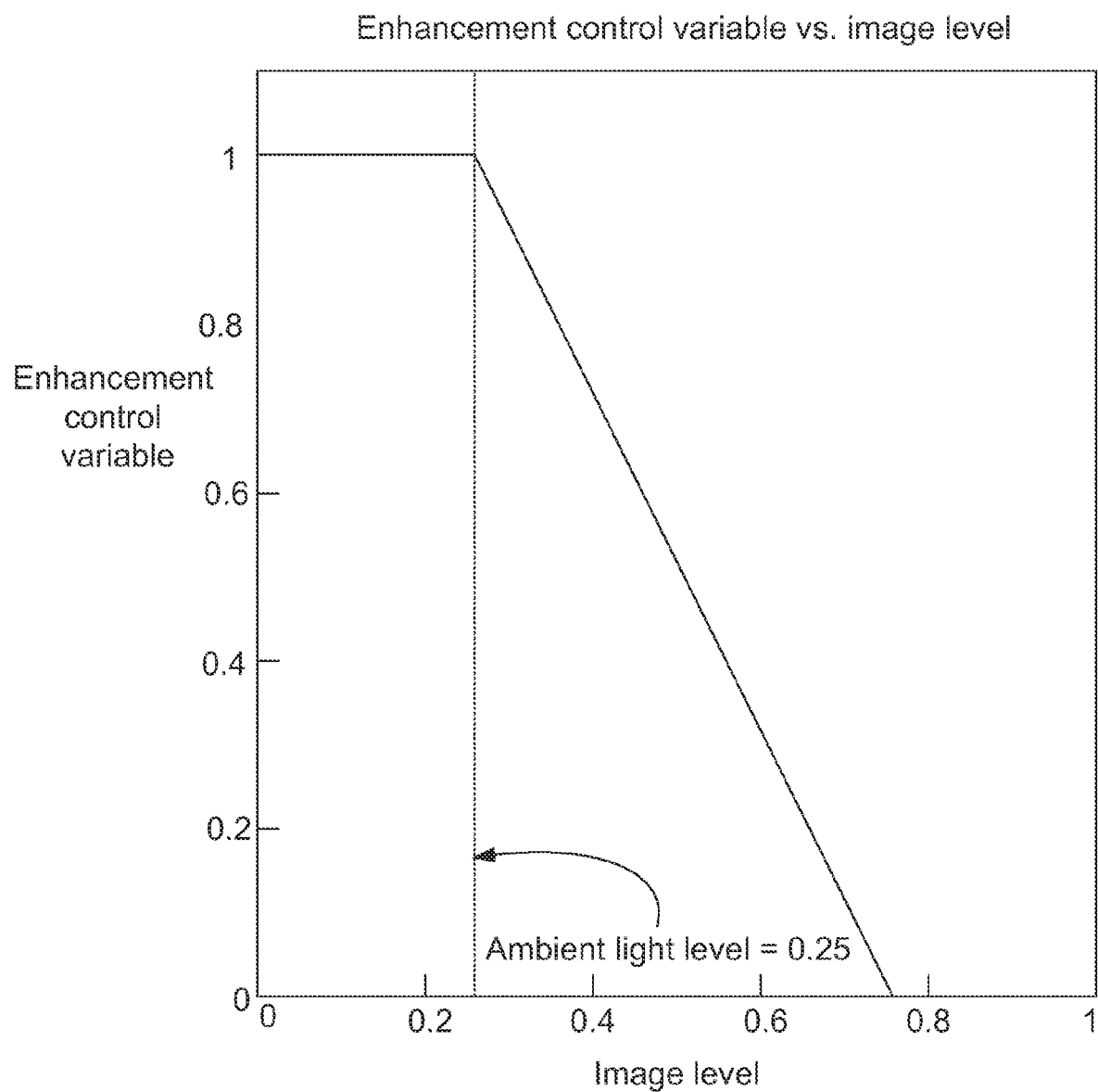

FIG. 8(*a*) shows the corresponding enhancement control variable as a function of low-passed video input drive level (calibrated into display luminance levels as in FIG. 4(*b*)) for an exemplary ambient light level equal to 25% of the peak display device luminance level. The horizontal axis is normalized (to have values between 0 and 1) display device luminance level.

An alternative functional representation is:

$$E_g = \begin{cases} 1, A_L > I_L \\ 1 + k(A_L - I_L), \text{otherwise} \\ 0, k(A_L - I_L) > 1 \end{cases}$$

where k is a positive constant.

Using this functional representation with k=2, FIG. 8(*b*) shows the corresponding enhancement control variable as a function of low-passed video input drive level for an ambient light level equal to 25% of the peak display device luminance level.

The disclosed two functional representations define a real-time enhancement control variable which controls the high-pass and/or low-pass processors on a pixel-by-pixel basis. Both functions reduce the amount of contrast enhancement applied to pixels with luma levels greater than the equivalent ambient light level. One usage of the enhancement control variable $E_g$, is to multiply the previously defined high-pass and low-pass static gains by $E_g$, on a pixel by pixel basis.

A different approach to reduce excessive contrast enhancement processing in image areas where pixels luma levels are greater than the equivalent ambient light level is to remap the image luma signal prior to and/or after local contrast enhancement. The function used to remap the video image luma is dependent on the ambient light levels. One of many possible implementations is to use an appropriate function representation, such as a gamma curve shape defined below:

$$Y(x) = x^\gamma$$

where $0<x<1, 0<\gamma<1$, x is the normalized (normalized to have values between 0 and 1) video input luma level and Y is the adjusted output luma level.

The gamma curve can be used to generate a predetermined input-output map of luminance which varies in response to the detected ambient light level. For low levels of ambient light the map can be configured to pass the luma data without change. With increasing ambient light levels the curve is adjusted to increase the slope of the luma map for low input luma levels, and decrease the slope for high input luma levels. The ambient light level is normalized to the range of equivalent display drive luminance levels (radiated or re-radiated or generated) by the display.

Figure 9A:
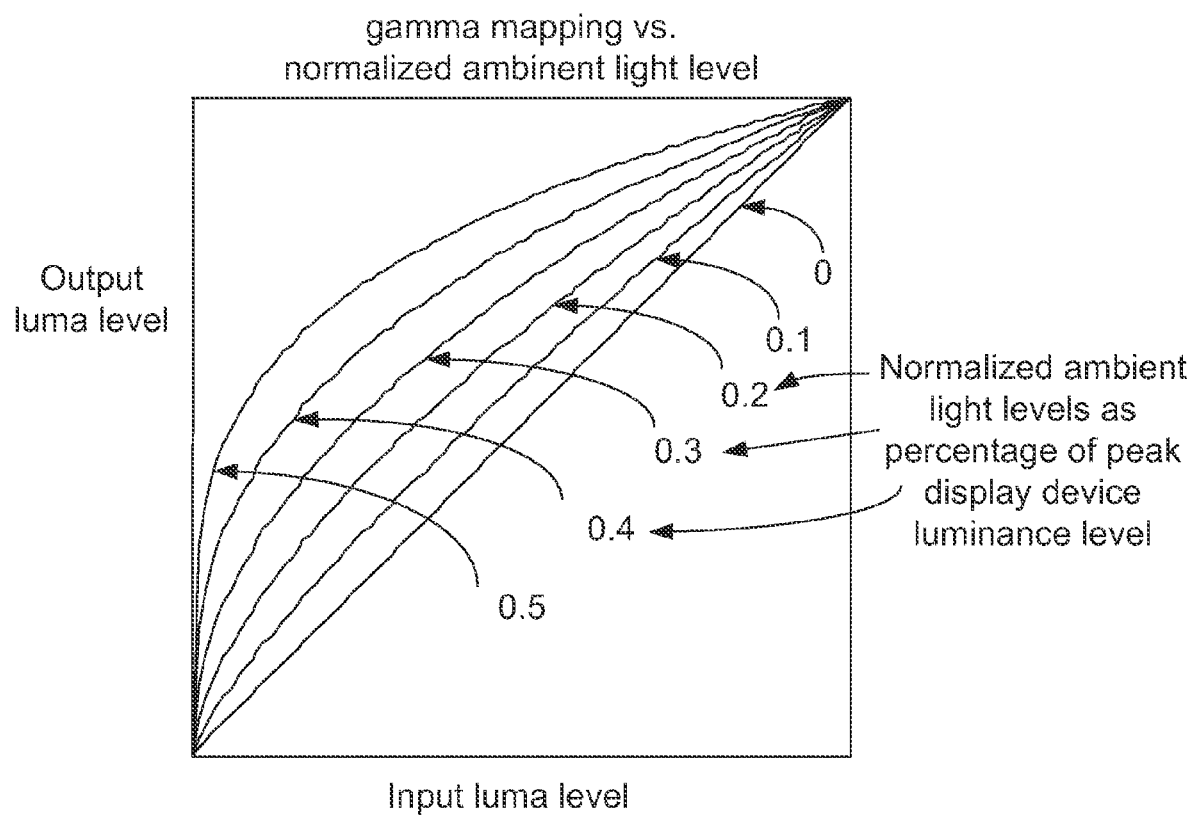
FIG. 9(a) shows a set of exemplary gamma mapping curves.

FIG. 9(a) shows a set of exemplary gamma mapping curves. The mapping curves shown in FIG. 9(a) are given by:

$$Y(x) = x^\gamma$$

where $0 < x < 1$, $$\gamma = \begin{cases} (1 - \text{ambient\_light\_level})^2, & \text{ambient\_light\_level} < 0.5 \\ 0.25, & \text{ambient\_light\_level} \geq 0.5 \end{cases}$$

Both image and estimated ambient light levels are normalized to the available display device luminance intensity range. FIG. 9(a) shows 6 curves used to map input luma level to output luma level when the ambient light level equals to 0% (0), 10% (0.1), 20% (0.2), 30% (0.3), 40% (0.4), and 50% (0.5) of peak display device luminance level, respectively. These mapping curves could be functionally generated such as described above, or a selected set of curves could be pre-calculated and applied to pre-determined ambient light conditions.

Figure 9B:
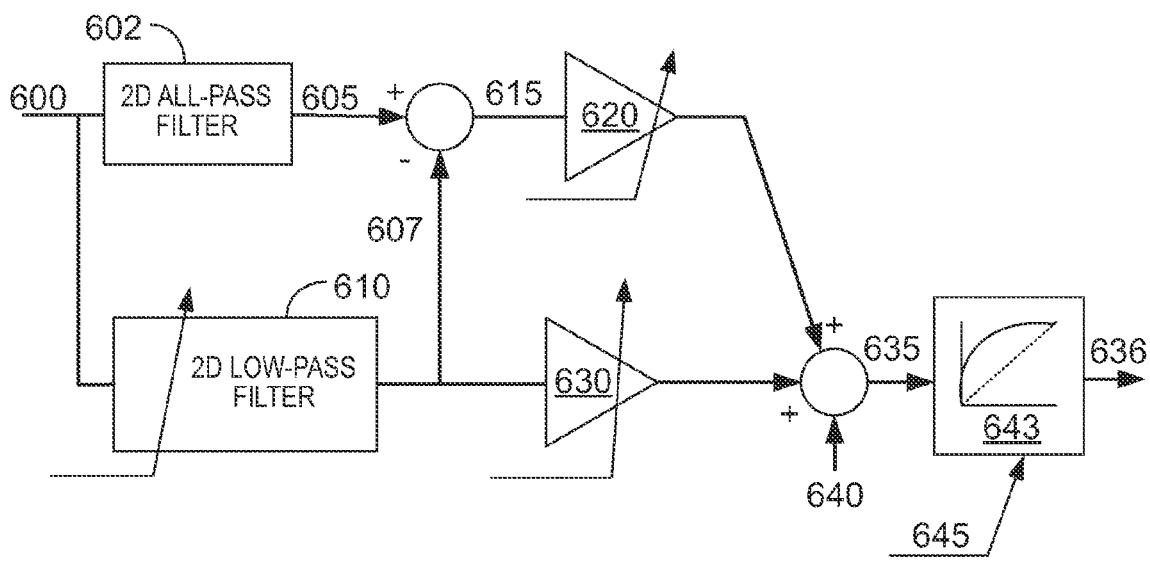
FIGS. 9(b) and 9(c) show embodiments of using gamma mapping curves for adaptive luminance adjustment.

FIG. 9(b) shows an embodiment using gamma mapping curves for adaptive luma adjustment after local contrast enhancement. Referring back to FIG. 5, the local contrast enhanced luminance signal 635 is further adjusted based on gamma mapping curves 643, which are dependent on the ambient light level 645. The finally processed luma signal is outputted as signal 636. In FIG. 7, prior processing of the signal occurs (the high-pass and/or low-pass processors are adaptively adjusted by the enhancement control variable based on the relative intensity level of ambient light and displayed image brightness in the pixel), before the local contrast enhancement process is applied. In FIG. 9(b), posterior processing—local luma adjustment, based on the relative intensity level of ambient light and displayed image brightness in the pixel, is done after local contrast enhancement processing.

Figure 9C:
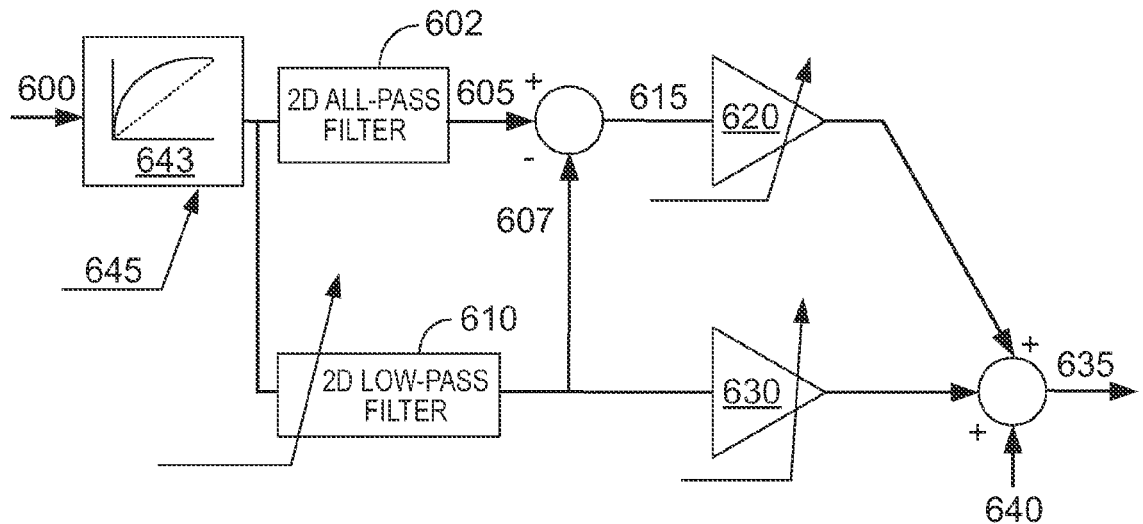

FIG. 9(c) shows another embodiment using gamma mapping curves for adaptive luma adjustment prior to local contrast enhancement.

Figure 9D:
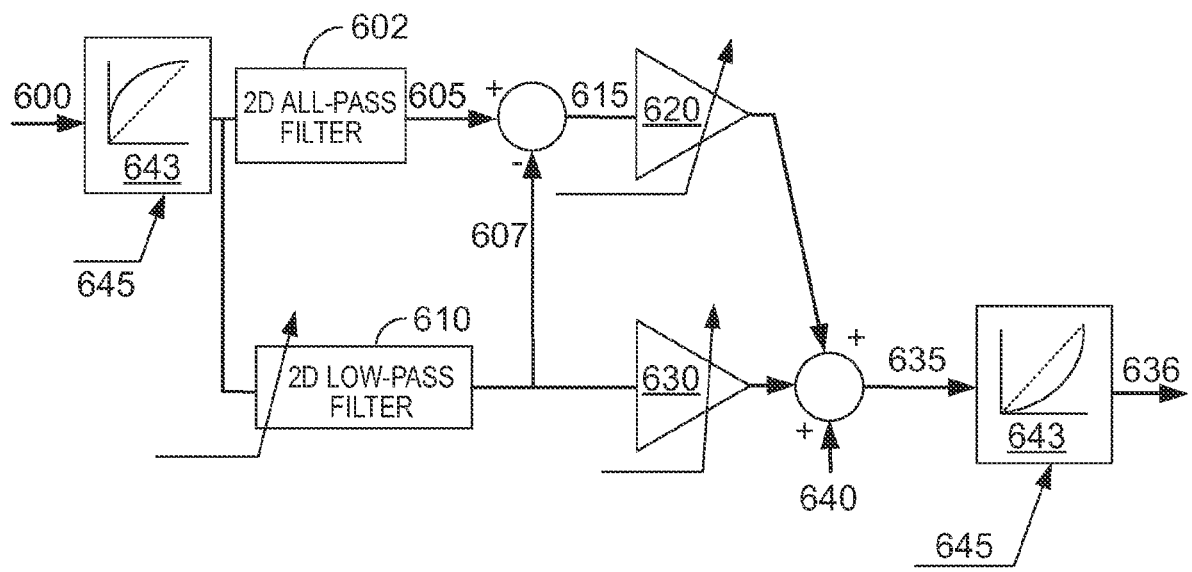
FIG. 9(d) shows an embodiment using two complementary or nearly complementary gamma mapping curves for adaptive luminance adjustment.

An additional approach may use two complementary or nearly complementary gamma mapping curves as shown below. As shown in FIG. 9(d), the upwardly curved gamma map prior to local contrast enhancement reduces the effective local contrast enhancement for bright areas of the image, while increasing it dark areas. The second gamma mapping curve restores the overall image levels. The approach can be used to restore the original image luma to uniform areas of the image.

A number of embodiments of the invention have been described. Nevertheless, it will be understood that various modifications may be made without departing from the spirit and scope of the invention. Accordingly, other embodiments are within the scope of the following claims.

What is claimed is:

1. A method of preparing a video signal for a display, comprising:
    processing the video signal by:
        detecting ambient light levels; and
        performing local contrast enhancement processing on the video signal based on the detected ambient light levels to produce a processed video signal, wherein the local contrast enhancement processing comprises a spatial filtering operation to determine luminance on a pixel-by-pixel basis; and
    presenting the processed video signal to the display.

2. The method of claim 1 wherein luminance is associated with object shapes and textures.

3. The method of claim 1, wherein the spatial filtering operation uses a spatial filter that comprises a two dimensional spatial filter.

4. The method of claim 1, wherein the filtering operation uses a spatial filter that varies based on detected ambient light levels.

5. The method of claim 1, wherein the local contrast enhancement processing further comprises determining an enhancement for each pixel depending on pixel image brightness and detected ambient light levels.

6. The method of claim 5, wherein the local contrast enhancement processing is characterized by a static gain.

7. The method of claim 6, wherein the static gain increases when the pixel image brightness of a pixel is less than one of the detected ambient light levels and decreases when the pixel image brightness is greater than one of the detected ambient light levels.

8. The method of claim 5, wherein the local contrast enhancement processing is characterized by a dynamic gain.

9. The method of claim 5, further comprising adjusting the local contrast enhancement processing based on a comparison of pixel image brightness to one of the detected ambient light levels.

10. The method of claim 9, wherein the adjusting of the enhancement processing is controlled by an enhancement control variable.

11. The method of claim 10, wherein the enhancement control variable has a functional representation with values increasing when the pixel image brightness is less than one of the detected ambient light levels and decreasing when the pixel image brightness is greater than one of the detected ambient light levels.

12. The method of claim 5, wherein the local contrast enhancement processing comprises a low-pass processing component and a high-pass processing component.

13. The method of claim 1, further comprising performing a luminance adjustment process dependent on a comparison of a pixel image brightness with one of the detected ambient light levels, the luminance adjustment process being performed after the local contrast enhancement processing.

14. The method of claim 13, wherein the luminance adjustment processing is controlled in accordance with an input-output luminance mapping table dependent on one of the detected ambient light levels.

15. The method of claim 14, wherein the input-output luminance mapping table comprises a set of mapping curves generated by a functional representation of remapping input luminance onto an adjusted output luminance.

16. The method of claim 15, wherein the functional representation is a gamma function.

17. The method of claim 1, further comprising performing a luminance adjustment process dependent on a comparison of a pixel image brightness with one of the detected ambient light levels, the luminance adjustment process being performed before the local contrast enhancement processing.

18. The method of claim 17, wherein the luminance adjustment processing is controlled in accordance with an input-output luminance mapping table dependent on one of the detected ambient light levels.

19. The method of claim 1, further comprising performing two luminance adjustment processes dependent on a comparison of a pixel image brightness with one of the detected ambient light levels, the luminance adjustment processes being performed before and after the local contrast enhancement processing.

20. The method of claim 19, wherein the two luminance adjustment processes are substantially complementary.

21. The method of claim 19, wherein the luminance adjustment processing is controlled in accordance with an input-output luminance mapping table dependent on the one of the detected ambient light levels.

22. A video processing system having a display and video signal comprising:
  a device for detecting ambient light levels on the display and for providing a detected ambient light level signal;
  a processor responsive to the detected ambient light level signal for:
    processing the video signal, and
    performing pixel-by-pixel contrast enhancement processing on the video signal based on the detected ambient light levels to provide a processed video signal, the contrast enhancement processing comprising
    performing a spatial filtering operation on the video signal to determine luminance on a pixel-by-pixel basis; and
  a display device having an active screen area for presenting the processed video signal on the display and surrounding areas.

23. The video processing system of claim 22, wherein the device for detecting the ambient light levels comprises a camera for imaging at least one of the active screen area and the surrounding areas of the display device.

24. The video processing system of claim 22, wherein the device for detecting the ambient light levels comprises one or more light sensors located near the active screen area of the display device.

25. The video processing system of claim 22, wherein the spatial filtering is performed using a spatial filter comprising a 2-D high-pass filter.

26. The video processing system of claim 22, wherein the spatial filtering is performed using a spatial filter comprising an all-pass filter and a 2-D low-pass filter.

27. The video processing system of claim 26, wherein the spatial filtering is performed using a spacial filter comprising a 2-D low-pass filter responsive to the detected ambient light level signal.

28. The video processing system of claim 22, wherein the processor comprises a comparator for:
  comparing pixel image brightness to one of the detected ambient light levels: and
  providing a pixel based contrast enhancement processing signal based on the comparison.

* * * * *